(12) United States Patent
Hummel

(10) Patent No.: US 7,815,244 B2  
(45) Date of Patent: Oct. 19, 2010

(54) AIR GUIDING DEVICE

(75) Inventor: Conrad Hummel, Stuttgart (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 0 days.

(21) Appl. No.: 12/388,527

(22) Filed: Feb. 19, 2009

(65) Prior Publication Data
US 2009/0212597 A1 Aug. 27, 2009

(30) Foreign Application Priority Data
Feb. 23, 2008 (DE) .................... 10 2008 010 873

(51) Int. Cl.
*B62D 35/00* (2006.01)
(52) U.S. Cl. ................ 296/180.1; 296/180.5
(58) Field of Classification Search ............. 296/180.1, 296/180.5; D12/181, 190, 196
See application file for complete search history.

(56) References Cited

U.S. PATENT DOCUMENTS

| D271,191 | S | * | 11/1983 | Amprim et al. ............. D12/181 |
| 4,773,692 | A | * | 9/1988 | Schleicher et al. ........ 296/180.5 |
| D305,017 | S | * | 12/1989 | Lund ......................... D12/181 |
| 5,120,105 | A | * | 6/1992 | Brin et al. ................ 296/180.5 |
| 5,165,751 | A | * | 11/1992 | Matsumoto et al. ...... 296/180.5 |
| 6,655,727 | B2 | * | 12/2003 | Hill et al. ................ 296/180.5 |
| 6,672,651 | B1 | * | 1/2004 | Shuen ..................... 296/180.5 |
| 6,935,218 | B2 | * | 8/2005 | Urvoy ........................ 89/37.07 |
| 7,322,638 | B2 | * | 1/2008 | Larson et al. ............ 296/180.5 |
| 7,380,871 | B2 | * | 6/2008 | Froeschle et al. ........ 296/180.5 |
| 7,387,330 | B2 | * | 6/2008 | Froeschle et al. ........ 296/180.5 |
| 7,387,331 | B2 | * | 6/2008 | Froeschle et al. ........ 296/180.5 |
| 7,399,026 | B2 | * | 7/2008 | Froeschle et al. ........ 296/180.5 |
| 7,438,347 | B2 | | 10/2008 | Froeschle et al. |
| D586,711 | S | * | 2/2009 | Sato .......................... D12/181 |
| D606,918 | S | * | 12/2009 | Larson ...................... D12/181 |
| 7,625,035 | B2 | * | 12/2009 | Vlahovic .................. 296/180.5 |
| 2002/0074826 | A1 | * | 6/2002 | Presley .................... 296/180.1 |
| 2007/0001482 | A1 | * | 1/2007 | Larson ..................... 296/180.5 |
| 2007/0228773 | A1 | * | 10/2007 | Froeschle et al. ........ 296/180.5 |
| 2007/0228774 | A1 | * | 10/2007 | Vlahovic .................. 296/180.5 |
| 2007/0236046 | A1 | * | 10/2007 | Froeschle et al. ........ 296/180.5 |
| 2009/0212597 | A1 | * | 8/2009 | Hummel .................. 296/180.5 |

FOREIGN PATENT DOCUMENTS

DE 10214475 A1 2/2003  
DE 10 2006 014 260 10/2007

OTHER PUBLICATIONS

German Search Report dated Feb. 26, 2009.

* cited by examiner

*Primary Examiner*—Glenn Dayoan  
*Assistant Examiner*—Gregory Blankenship

(57) ABSTRACT

An air guiding device for a motor vehicle, in particular a rear spoiler, can be moved between a retracted non-use position and at least one deployed use position and contains an air guiding body on which are disposed two lateral air guiding body sections which can be moved in the vehicle transverse direction. Here, it is important that, in the non-use position of the air guiding device, the lateral air guiding body sections form a common joint which runs in the vehicle longitudinal direction, with at least one of the two air guiding body sections having, on its side which forms an edge of the common joint, a depression at least in regions.

20 Claims, 1 Drawing Sheet

FIG. 1
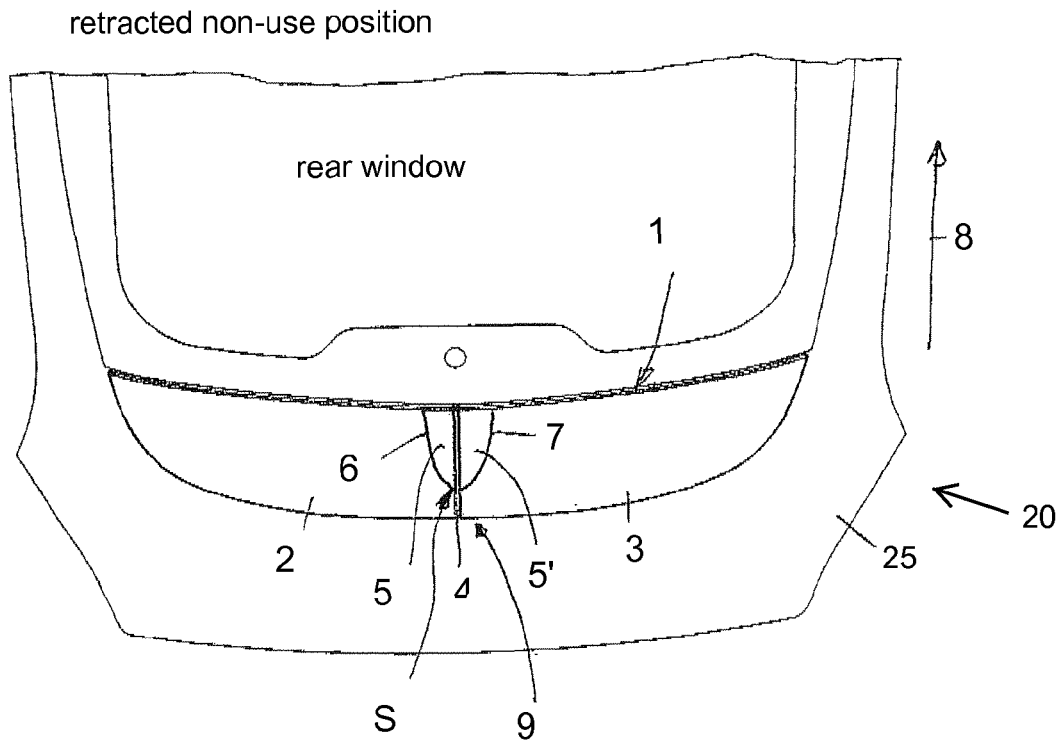
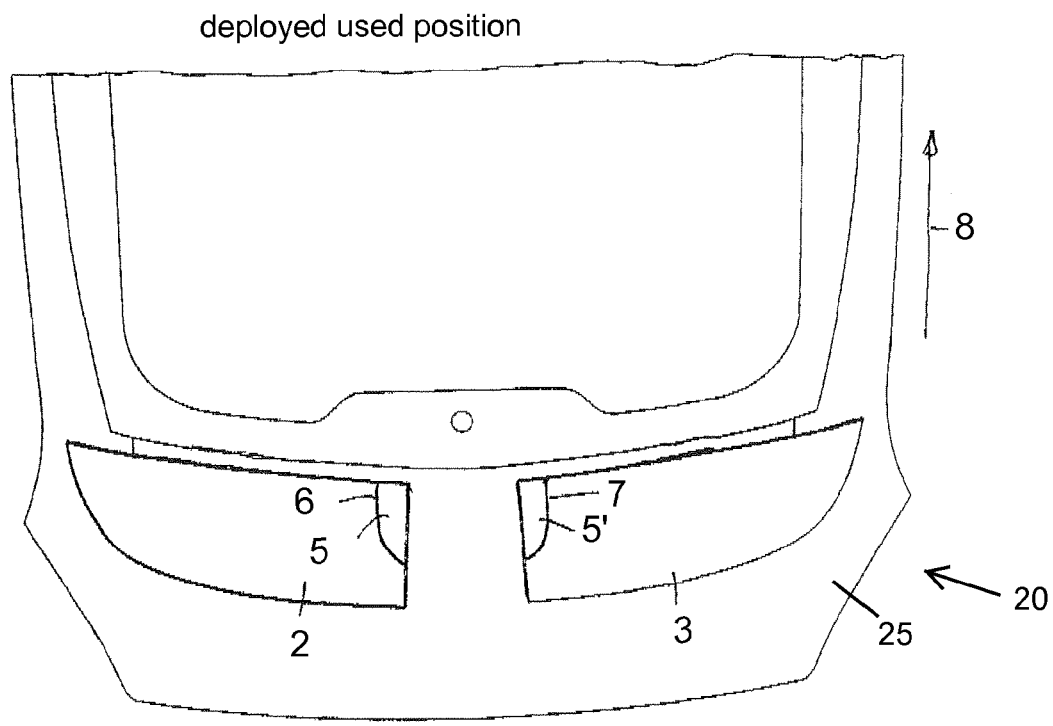
FIG. 2

AIR GUIDING DEVICE

CROSS-REFERENCE TO RELATED APPLICATION

This application claims the priority, under 35 U.S.C. §119, of German application DE 10 2008 010 873.1, filed Feb. 23, 2008; the prior application is herewith incorporated by reference in its entirety.

BACKGROUND OF THE INVENTION

Field of the Invention

The present invention relates to an air guiding device for a motor vehicle, in particular a rear spoiler. The air guiding device can be moved between a retracted non-use position and at least one deployed use position and which contains an air guiding body on which are arranged two lateral air guiding body sections which can be moved in a vehicle transverse direction. The invention also relates to a motor vehicle which is fitted with an air guiding device of said type.

A generic air guiding device is known for example from published, non-prosecuted German patent application DE 10 2006 014 260 A1, corresponding to U.S. Pat. No. 7,438,347. Here, the known air guiding device contains a substantially centrally arranged air guiding body on which are arranged two lateral air guiding body sections which can be moved in the vehicle transverse direction. Here, the air guiding device can be adjusted between a retracted non-use position and a deployed use position, with the two lateral air guiding body sections being deployed in the use position of the air guiding device, and thereby enlarging the air guiding surface which is provided for generating downforce.

In particular in very high-value sports cars having an air guiding device of this type, it must be ensured that the visual appearance and therefore an overall aesthetic impression are not adversely affected by large tolerances in the joint region, the so-called gap dimension. In contrast to static joints, in which the joint edges are fixedly positioned with respect to one another, in the case of joints in which the joint edges are formed by adjustable parts, there is always the problem that the adjusting movement of the individual components which form the respective joint edges must take place in such a precise fashion that the joint tolerances do not exceed a certain dimension. This is particularly difficult in particular in the case of movable parts, such as, for example, laterally deployable air guiding body sections of an air guiding device, since the air guiding body sections are exposed to a not inconsiderable loading when they are in their deployed position, which can have the result that the lateral air guiding body sections are no longer exactly aligned with respect to one another in their retracted rest position, which visually stands out in particular in the region of the joint formed by the two air guiding body sections.

SUMMARY OF THE INVENTION

It is accordingly an object of the invention to provide an air guiding device that overcomes the above-mentioned disadvantages of the prior art devices of this general type, which embodiment in particular conceals relatively large tolerances in the region of a joint formed by two lateral air guiding body sections.

With the foregoing and other objects in view there is provided, in accordance with the invention, an air guiding device for a motor vehicle, which can be moved between a retracted non-use position and at least one deployed use position. The air guiding device contains an air guiding body, and two lateral air guiding body sections disposed on the air guiding body and can be moved in a vehicle transverse direction. In the non-use position of the air guiding device, the two lateral air guiding body sections form a common joint running in a vehicle longitudinal direction, with at least one of the two air guiding body sections having, on a side forming an edge of the common joint, a depression formed therein at least in regions.

The general concept on which the invention is based is, in the case of two movable components which form a joint with one another in at least one position, to provide a depression at least in regions at least in one of the two components in the region of its side which forms an edge of the joint. As components, consideration is given here in particular to two lateral air guiding body sections which are movable in the vehicle transverse direction and which are arranged on an air guiding body of an air guiding device. Here, the two lateral air body sections, in their non-use position, form the above-mentioned common joint which runs in the vehicle longitudinal direction, which joint is visually softened by the provision of a depression which is arranged at least in regions along the joint. The depression specifically hinders a visual comparison of the height positions of the two air guiding body sections which are arranged adjacent to one another, such that any joint tolerances which may be present are visually considerably less perceptible than without the depression according to the invention. Here, the depression may for example be configured as an aerodynamically configured impression, and may thereby preferably leave the air guidance, and the efficiency of the air guiding device, entirely unaffected. Furthermore, a depression of this type may also constitute a visually interesting design element which permits a clear delimitation or distinction with respect to competitors.

In one advantageous refinement of the solution according to the invention, the two air guiding body sections have, on their side which forms in each case one edge of the joint, a mirror-symmetrical depression. Since the joint runs in the vehicle longitudinal direction and motor vehicles are conventionally of mirror-symmetrical design in the vehicle longitudinal direction, depressions of such design may easily be incorporated into an otherwise already visually established appearance.

The two edges of the depression expediently together describe the shape of a parabola. A parabola of this type can usually also be seen at other points on sports cars, for example in rear rounded portions of the rear side windows as viewed in the direction of travel, and accordingly fits into the external appearance of a motor vehicle of this type in a visually unobtrusive manner. If desired, the shape of the parabola or the depressions themselves may also be configured such that they are first positively perceived as a visually striking design element, yet second nevertheless visually conceal unavoidable tolerances between the two adjacent lateral air guiding body sections in the region of the joint.

It is self-evident that the features specified above and the features yet to be explained below can be used not only in the respectively specified combination but also in other combinations or individually without departing from the scope of the present invention.

Other features which are considered as characteristic for the invention are set forth in the appended claims.

Although the invention is illustrated and described herein as embodied in an air guiding device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 1 is a diagrammatic, partial sectional view of an air guiding device in a retracted non-use position.

FIG. 2 is a diagrammatic, partial sectional view of the air guiding device in a deployed use position.

DETAILED DESCRIPTION OF THE INVENTION

Referring now to FIGS. 1 and 2 of the drawing in detail, there is shown an air guiding device 1, for a motor vehicle 20 which is only partially illustrated. The air guiding device 1 has an air guiding body (likewise not illustrated in any more detail) and two air guiding body sections 2 and 3 which are arranged laterally on the air guiding body. Here, the air guiding device 1 may for example be embodied as a rear spoiler that is adjustable between a retracted non-use position as shown in FIG. 1 and at least one deployed use position as shown in FIG. 2. In the retracted non-use position, the air guiding device 1 is preferably integrated within, and if appropriate also so as to be aligned flush with, a vehicle outer contour, and is therefore visually integrated into the vehicle. In the use position, the air guiding device 1 projects beyond the vehicle outer contour, and is aerodynamically active. The air guiding device 1 is preferably arranged on a tailgate 25 of a motor vehicle 20.

In order to be able to enlarge an air guiding surface which acts so as to generate downforce on the motor vehicle, the two lateral air guiding body sections 2 and 3 can be deployed in the vehicle transverse direction, such that the non-illustrated air guiding body is widened overall. The lateral deploying movement of the air guiding body sections 2 and 3 takes place here conventionally during the deploying movement of the air guiding body, and is for example coupled to the deploying movement of the latter. The lateral deploying movement of the air guiding body sections 2 and 3 may alternatively be separate from and independent of the deploying movement of the air guiding body. In the non-use position illustrated in FIG. 1, the two air guiding body sections 2 and 3 form a common joint 4 which runs in the vehicle longitudinal direction. According to the invention, at least one of the two air guiding body sections 2, 3 has, on its side which forms an edge 6, 7 of the joint 4, a depression 5, 5' at least in regions. Here, according to the illustration, the two depressions 5, 5' are formed so as to be mirror-symmetrical with respect to one another and are restricted substantially to a visible upper side of the two air guiding body sections 2 and 3. The two edges 6 and 7 of the depressions 5 and 5' may also—as seen in a plan view of the air guiding device 1—together form the shape of a parabola, whose apex S, according to the illustration, is preferably arranged at the rear in the direction of travel 8, that is to say adjacent to a non-illustrated rear end of the motor vehicle. It is at the same time possible to see that, in the illustrated embodiment, the apex S of the parabola formed by the two edges 6 and 7 is arranged so as to be spaced apart from a rear edge 9 of the air guiding device 1. The rear edge 9 may—as illustrated—be elevated in relation to the height level of the apex S on the surface of the air guiding body sections 2 and 3, such that the surface of the air guiding body sections 2 and 3 rises—proceeding from the apex S—up to the rear edge 9.

In general, the depressions 5, 5' may be of curved or planar form depending on the desired visual or aerodynamic configuration. In the illustrated embodiment, in each case the rearmost region of the depressions 5 and 5' in the direction of travel 8 is of a curved configuration while the two foremost regions of the depressions 5 and 5' in the direction of travel 8 are of virtually a planar configuration. Here, the transition between a planar and a curved region of the depression 5, 5' may be continuous. As an alternative to the illustrated profile of the edges 6 and 7 in the shape of a parabola, other shape profiles of the edges 6 and 7 are of course also conceivable, such as for example in the form of a section of an oval, of a triangle (equilateral or isosceles) etc. The depth of the joint 4 may be formed so as to be constant or so as to vary as viewed over its profile in the vehicle longitudinal direction. Moreover, at least the air guiding body sections 2 and 3 with the depressions 5, 5' are painted in the same vehicle colour as the rest of the motor vehicle.

As a result of the depressions 5 and 5' which are provided according to the invention, any joint tolerances and/or height differences between the two lateral air guiding body sections 2 and 3 can be visually concealed, as a result of which the external appearance can be enhanced considerably. In this way, it is also possible in particular to accept greater production tolerances which, in an embodiment without the depressions 5, 5' according to the invention, would in themselves lead to visual complaints. Aside from this, the depressions 5, 5' according to the invention may also be intentionally used as visual design elements, which permit a differentiation with respect to competitors.

The invention claimed is:

1. An air guiding device for a motor vehicle, which can be moved between a retracted non-use position and at least one deployed use position, the air guiding device comprising:
    an air guiding body; and
    two lateral air guiding body sections disposed on said air guiding body, said two lateral air guiding body sections moveable in a vehicle transverse direction;
    in the non-use position of the air guiding device, said two lateral air guiding body sections forming a common joint running in a vehicle longitudinal direction, with at least one of said two air guiding body sections having, on a side forming an edge of said common joint, a depression formed therein at least in regions, the depression having a length in the vehicle longitudinal direction that exceeds a width of the depression in the vehicle transverse direction.

2. The air guiding device according to claim 1, wherein said two air guiding body sections have, on said side which forms in each case one said edge of said common joint, a mirror-symmetrical depression formed therein and together defining two depressions.

3. The air guiding device according to claim 1, wherein said depression is restricted substantially to a visible upper side of a respective one of said air guiding body sections.

4. The air guiding device according to claim 2, wherein said two edges of said depressions together describe a shape of a parabola.

5. The air guiding device according to claim 4, wherein said parabola has an apex defined by said two edges of said common joint and disposed at a rear in a direction of travel.

6. The air guiding device according to claim 2, wherein said depressions are curved at least in regions.

7. The air guiding device according to claim 2, wherein said depressions of said two lateral air guiding body sections are formed so as to visually conceal at least one of any joint tolerances and height differences between said two lateral air guiding body sections.

8. The air guiding device according to claim 1, wherein the air guiding device is a rear spoiler.

9. A motor vehicle, comprising:
an air guiding device moveable between a retracted non-use position and at least one deployed use position, the air guiding device containing:
an air guiding body; and
two lateral air guiding body sections disposed on said air guiding body, said two lateral air guiding body sections moveable in a vehicle transverse direction;
in the non-use position of said air guiding device, said two lateral air guiding body sections forming a common joint running in a vehicle longitudinal direction, with each of said two air guiding body sections having, on a side forming an edge of said common joint, a depression formed therein at least in regions, the depression having a length in the vehicle longitudinal direction that exceeds a width of the depression in the vehicle transverse direction.

10. The air guiding device according to claim 9, wherein said two air guiding body sections have, on said side which forms in each case one said edge of said common joint, a mirror-symmetrical depression formed therein and defining two depressions.

11. The air guiding device according to claim 9, wherein said depression is restricted substantially to a visible upper side of a respective one of said air guiding body sections.

12. The air guiding device according to claim 10, wherein said two edges of said depressions together describe a shape of a parabola.

13. The air guiding device according to claim 12, wherein said parabola has an apex defined by said two edges of said common joint and is disposed at a rear in a direction of travel.

14. The air guiding device according to claim 10, wherein said depressions are curved at least in regions.

15. The air guiding device according to claim 10, wherein said depressions of said two lateral air guiding body sections are formed so as to visually conceal at least one of any joint tolerances and height differences between said two lateral air guiding body sections.

16. The air guiding device according to claim 9, wherein said air guiding device is a rear spoiler.

17. An air guiding device for a motor vehicle, the air guiding device comprising:
an air guiding body; and
two lateral air guiding body sections disposed on said air guiding body and being laterally spaced from one another in a vehicle transverse direction, each of the two laterally spaced air guiding body sections having a front edge facing forward in a vehicle longitudinal direction, a rear edge facing rearward in the vehicle longitudinal direction and an inner side edge facing inwardly in the vehicle transverse direction and toward the other of the air guiding body sections, the inner side edges each being formed with a depression extending from the front edge of the respective air guiding body section to a position between the front and rear edges thereof, the depressions being substantially mirror symmetrical with one another and each having a length in the vehicle longitudinal direction that exceeds a width of the respective depression in the vehicle transverse direction.

18. The air guiding device according to claim 17, wherein the two laterally spaced air guiding body sections are selectively moveable toward one another and into a non-use position so that the inner side edges thereof abut in substantially edge-to-edge contact.

19. The air guiding device according to claim 17, wherein each of the air guiding body sections has a top surface, the depressions extending down into the respective top surfaces and intersecting the respective top surfaces at curved lines.

20. The air guiding device according to claim 17, wherein the depressions are substantially parabolically generated.

* * * * *